March 25, 1941.    R. H. BOWEN ET AL    2,236,027
PULLEY
Filed March 18, 1940    3 Sheets-Sheet 1

WITNESSES:
Thomas W. Kerr, Jr.
William Bell

INVENTORS:
Russell H. Bowen &
William A. Williams,
BY Paul Paul
ATTORNEYS.

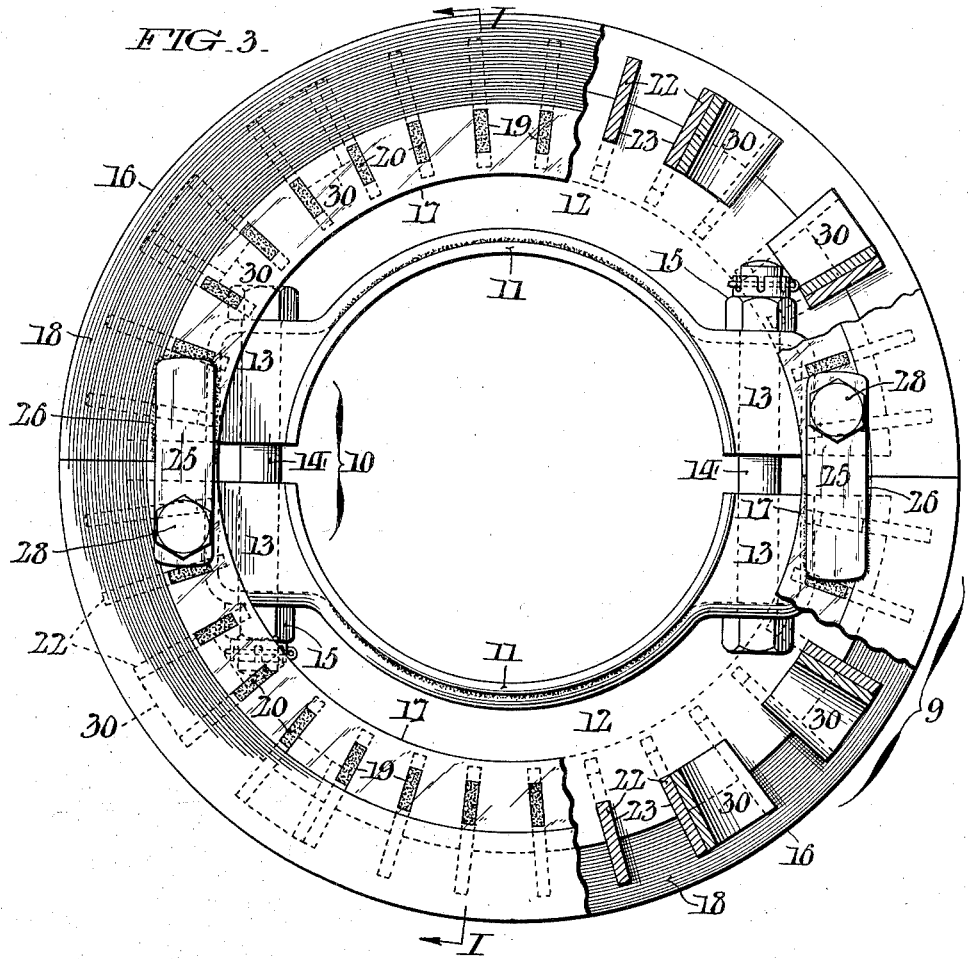
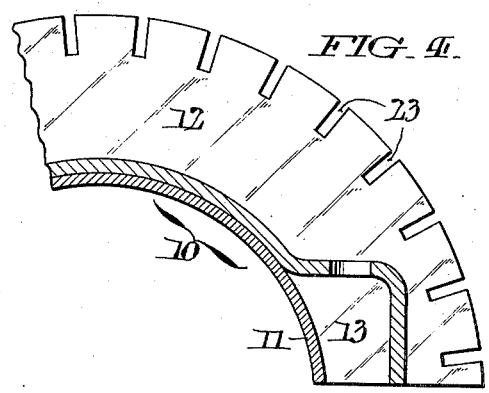

March 25, 1941.   R. H. BOWEN ET AL   2,236,027
PULLEY
Filed March 18, 1940   3 Sheets-Sheet 3
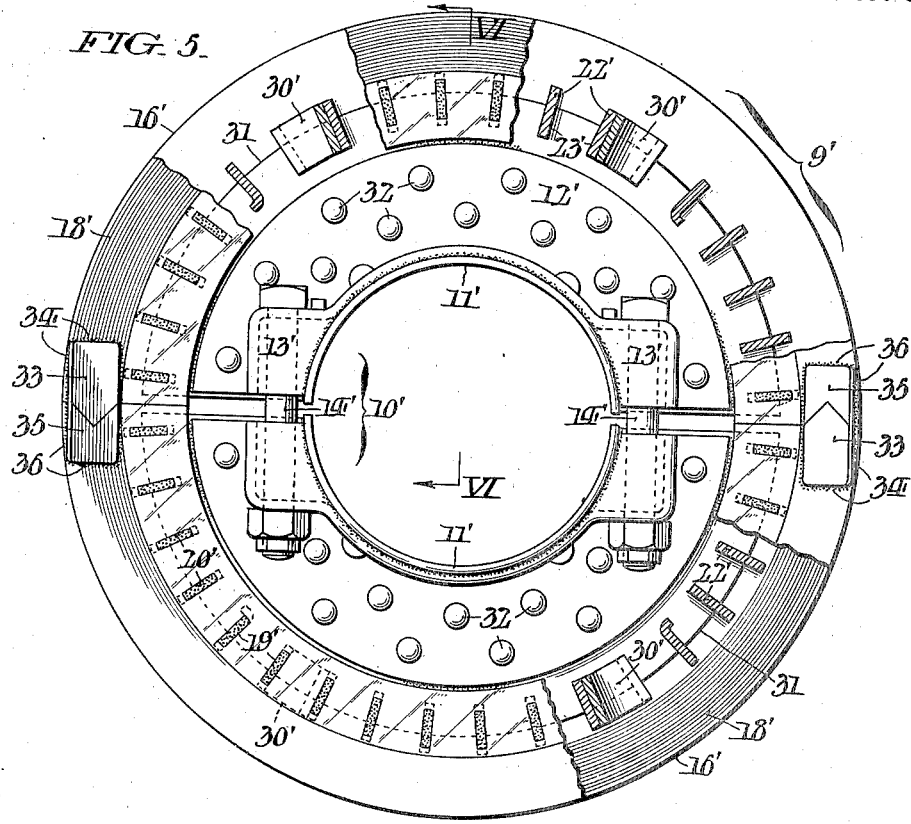
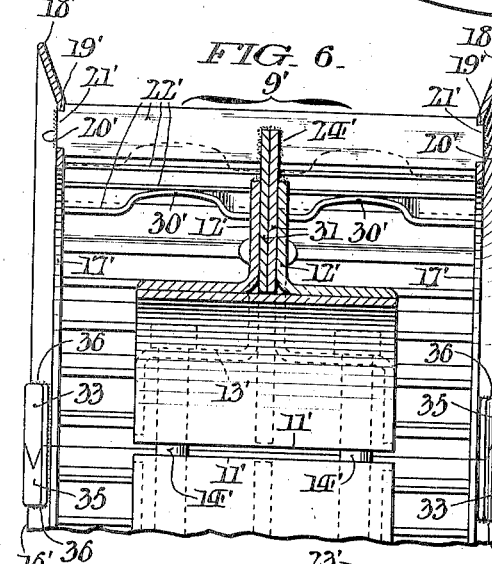
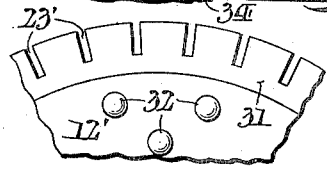
INVENTORS:
Russell H. Bowen &
William A. Williams,
BY Paul & Paul
ATTORNEYS.

Patented Mar. 25, 1941

2,236,027

UNITED STATES PATENT OFFICE 2,236,027

PULLEY

Russell H. Bowen and William A. Williams, Philadelphia, Pa., assignors to The American Pulley Company, Philadelphia, Pa., a corporation of Pennsylvania Application March 18, 1940, Serial No. 324,482

4 Claims. (Cl. 74—230.6)

This invention has reference, more particularly, to belt pulleys of the species comprising a hub, and a rim portion composed of circumferentially spaced radially-disposed elements for edge engagement with the inner face of the belt.

Pulleys of the indicated species are useful, as for example, on railway cars, auto-trucks, and so forth, for operating an electric generator or other mechanism by belt drive from the car or truck axle.

Objects of this invention are the production of sheet metal pulleys of the indicated character including structural matters whereby they are more expeditiously assembled or demounted than heretofore, with a minimum expenditure of time and labor; to interconnect the hub and rim in a manner whereby all torque of the former is directly communicated to the latter, or vice versa; and in general to enable production of such pulleys with preassurance of maximum efficiency and strength to withstand the severe service to which they are commonly subjected.

Other objects and ancillary advantages will be hereinafter noted, or become apparent from the following disclosure of this invention, considered in connection with the accompanying sheets of drawings, while the concluding claims concisely express the features of novelty over prior art.

In the drawings:

Fig. 3 is a side view of the pulley with parts removed or in section for easier explanation of certain details.

Fig. 4 is a fragmentary detail section, hereinafter fully described.

Fig. 5 is a side view of a modified form of this invention.

Fig. 6 is a fragmentary section taken on the plane VI—VI in the preceding figure.

Fig. 7 is a partial plan view with a minor portion broken out to better disclose an otherwise hidden detail; and, Fig. 8 is a fragmentary detail hereinafter fully described.

Figure 1:
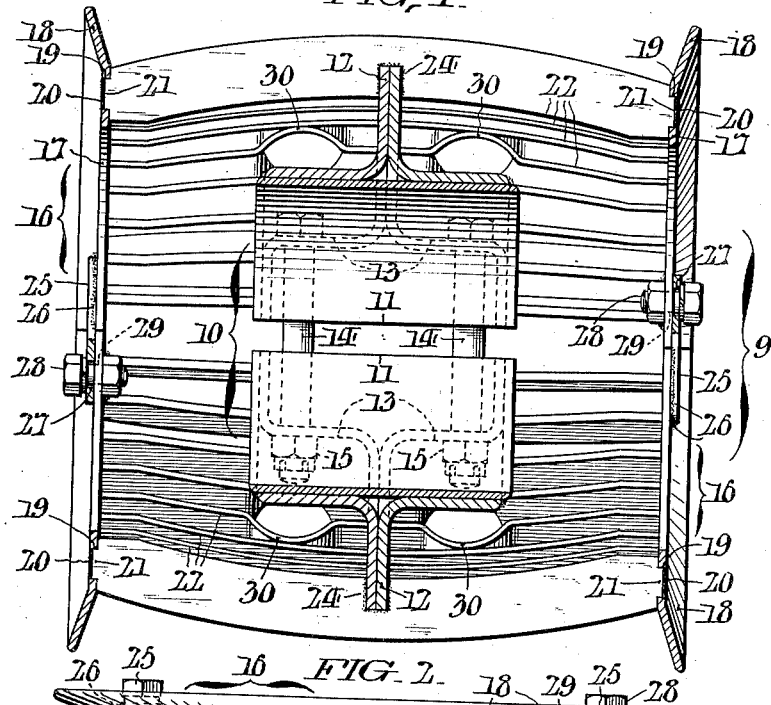
Fig. 1 is a longitudinal section through a preferred pulley construction in accordance with this invention; said section being taken on a plane substantially at right angles to that of the conventional juncture of the constituent halves, or as indicated by the arrows I—I in Fig. 3.

Referring more in detail to the drawings, and firstly to Figs. 1-4, inclusive, it will be observed the pulley 9 therein shown is of the split type, having the hub 10 composed of semi-circular components 11 preferably with a medial sustaining web 12, made up of counterpart sheet metal sections to include shoulder offsets 13, suitably apertured for passage of the clamp bolts 14 having castellated nuts 15.

Figure 2:
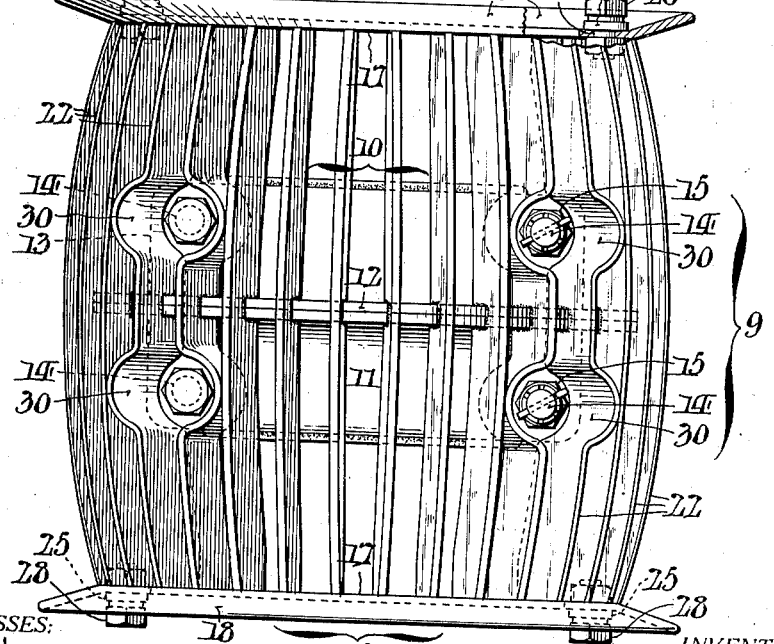
Fig. 2 is a plan view of the pulley with a fragmentary portion broken out for ease in explaining a minor detail, later on fully described.

The rim 16 comprises sheet metal rings 17 having flares or guard flanges 18, and each said ring is provided with circumferentially-spaced radially-directed slots 19 into which are rigidly secured, as by welds 20, the shouldered offset ends 21 of predeterminedly contoured cross slats or sheet metal vanes 22 that jointly define the pulley tread or belt engaging rim. The slats or vanes 22, as best understood from Figs. 1 and 2, are, conveniently, of arcual outline lengthwise with the end offsets 21 of a size to snugly fit opposing slots 19 in the respective rim rings 17, so that when said parts are united by the welds 20 a rigid rim 16 is provided. The individual slats or vanes 22 also are engaged in appropriate peripherally-spaced radial slots 23 provided for their part reception around the hub sustaining web 12, and to which they are united by welds 24. Thus it will be apparent that all torque imparted to the hub 10 is positively transmitted to the rim 16 and vice versa; while the pulley 9 as a whole is of very rigid character and comparatively light. To assemble the component halves of the pulley 9 in planar relation, use is made of tabs 25 attached to each ring 17 by welds 26, said tabs being apertured at 27 for passage of clamp bolts 28 through registering holes 29 in the respective ring halves 17.

To afford free access to the clamp bolts 14 and nuts 15 when assembling the split pulley 9 on a shaft, not shown, removing the same or effecting adjustment thereof, the nearby pair of slats or vanes 22 are locally recessed and reversely grooved at 30 to facilitate ready insertion of an appropriate tool for manipulating the nuts 15 or restraining the bolts 14 against rotation.

Referring now to the modified structure of Figs. 5-8, inclusive, corresponding reference characters with an added "prime" exponent are employed to obviate unnecessary repetitive description. It is to be observed, however, that in this form of the invention, which is preferable for large diameter pulleys, the slats or vanes 22' are straight and are attached medially of their length to a reinforcing ring or rings 31 in turn secured intermediate the hub sustaining webs 12' as by rivets 32; while the slat recesses or grooves 30' are only formed in individual slats or vanes 22'. For registration of the component halves of the pulley 9, in this form of the invention, use is made of reversely directed angle-pointed tabs 33, secured by seam welds 34 to the outer face of the respective guard flanges 18' of one half, for engagement in complementally recessed tabs 35 similarly attached by welds 36 to the opposing portions of the other half.

From the foregoing, the merits and advantages of this invention will be clearly apparent, while it is to be understood the illustrated embodiments are purely typical and the terms used in describing the same are non-limitative.

Having thus described our invention, we claim:

1. A belt pulley comprising complemental halves each including a hub portion with a substantially medial circumferential sustaining web, a rim defined by spaced rings and radially-disposed vanes with their ends secured in said rings and their medial parts partially engaged in and rigidly united to the sustaining web, means for holding the pulley halves in planar registration, and means for clamping said pulley halves together.

2. A belt pulley as defined in claim 1, wherein the vanes are of arcual contour lengthwise and have terminal reductions for engagement in corresponding circumferentially-spaced apertures in the rim spaced rings, similarly spaced radial slots in the hub sustaining web for partial reception of the medial parts of the vanes, and welds permanently unite all of said parts.

3. A belt pulley as defined in claim 1, wherein adjoining vanes are locally and opposedly recessed for access to the pulley clamping means, and apertured tabs on the respective halves hold said halves in assembly and afford passage of suitable means for holding them together.

4. A belt pulley as defined in claim 1, wherein the vanes are medially attached to a reinforcing ring, said ring being secured intermediate spaced sustaining webs to the hub portion, and tabs with interfitting ends hold the respective pulley halves in mutual planar registration.

RUSSELL H. BOWEN.
WILLIAM A. WILLIAMS.